E. A. PIERCE.
RESILIENT WHEEL.
APPLICATION FILED JUNE 26, 1913.

1,095,416.

Patented May 5, 1914.

WITNESSES:
Clarence M. Smith
Mabel G. Board

INVENTOR.
E. A. Pierce
BY
ATTORNEY

COLUMBIA PLANOGRAPH CO., WASHINGTON, D. C.

UNITED STATES PATENT OFFICE.

ERNEST A. PIERCE, OF SACRAMENTO, CALIFORNIA.

RESILIENT WHEEL.

1,095,416.  Specification of Letters Patent.  Patented May 5, 1914.

Application filed June 26, 1913.   Serial No. 775,885.

*To all whom it may concern:*

Be it known that I, ERNEST A. PIERCE, a citizen of the United States, residing at Sacramento, in the county of Sacramento, State of California, have invented certain new and useful Improvements in Resilient Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in wheels for vehicles and is particularly designed to take the place of pneumatic tired wheels now commonly used for motor vehicles of all kinds.

The object of the invention is to produce a resilient wheel which is not dependent upon pneumatic tires for its resiliency, but one in which the resiliency is given by a plurality of coiled springs suitably arranged and connected with a flexible rim in such a manner that when the wheel strikes a stone or jolt or any other unevenness in the road surface, that portion of the wheel which so strikes the same will give way before the same without causing the entire wheel to be lifted as is done in so many wheels designed to accomplish the same object as is my wheel.

A further object of the invention is to produce a simple and inexpensive device, and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1:
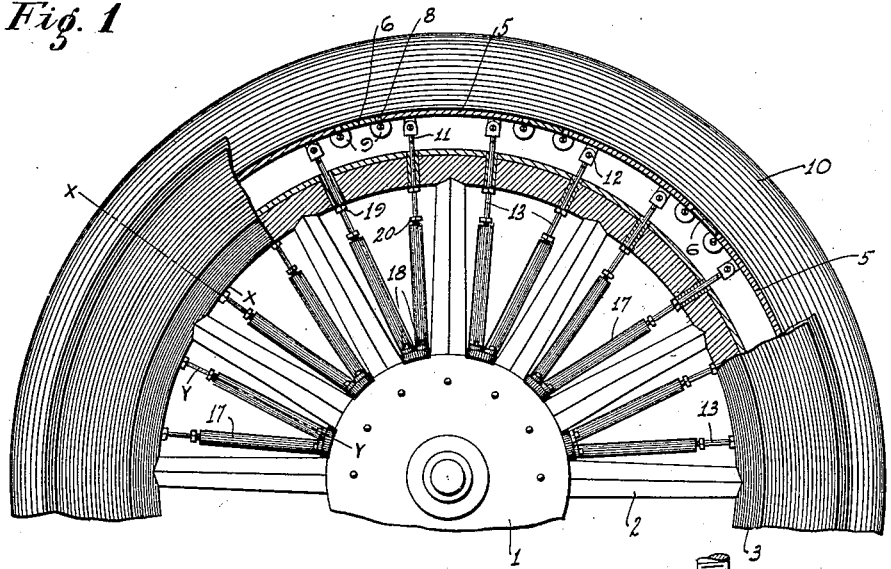
Figure 2:
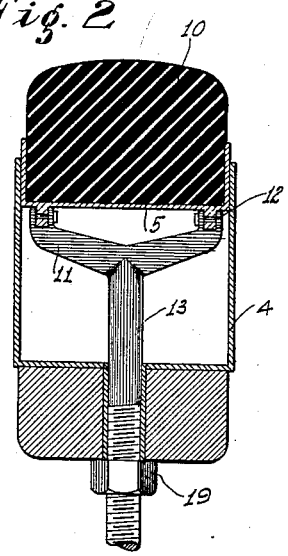
Figure 4:
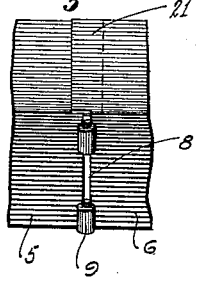
Figure 3:
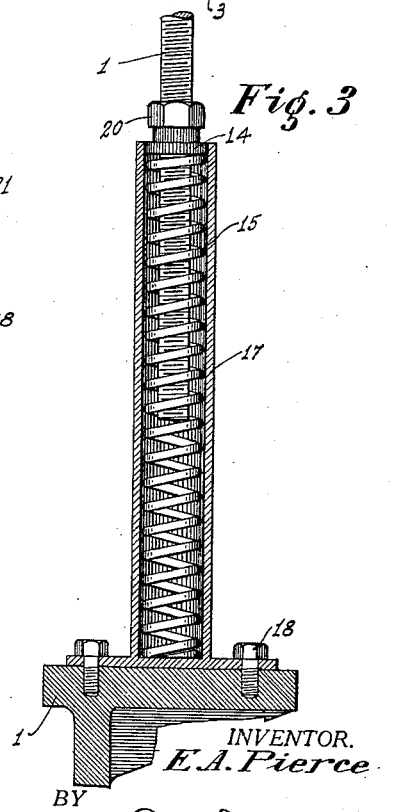

Figure 1 is a side elevation, partly broken out, of a portion of my improved wheel. Fig. 2 is a sectional view taken on a line X—X of Fig. 1. Fig. 3 is a sectional view taken on a line Y—Y of Fig. 1. Fig. 4 is a detached view of a hinge means for the rim segments of the wheel.

Referring now more particularly to the characters of reference on the drawings, the numeral 1 designates the hub of the wheel having the usual spokes 2 and a felly 3.

In providing my improved invention I first form on the felly 3 a substantially channel shaped rim 4, which rim will be hereinafter designated as the inner rim. I then provide another rim hereinafter styled the outer rim, which last named rim comprises a plurality of segments 5 and 6, the segments 5 being of a considerable greater length than the segments 6. Each segment is spaced from its adjacent segments a short distance as at 8 and is hinged to its adjacent segments by suitable hinges as at 9. The entire outer rim, composed of the segments 5 and 6 hinged together, as described, normally fits between the sides of the inner rim 4 and is capable of moving therebetween and as can readily be seen, one segment moving on its hinged or flexible connection with its adjacent segments can make an independent movement between the sides of the member 4. Disposed in the outer rim composed of these segments 5 and 6 I provide a solid rubber or other desired tire 10. I then provide a resiliency for the entire number of the segments 5 by providing each segment with a pair or more of bifurcated members 11 suitably hinged to the said segments 5 as at 12, each member 11 having a plunger rod 13 projecting through the rim 4 and felly 3 and provided with a plunger 14 moving against a spring 15 in a tube 17 bolted to the hub 1 as at 18. The plunger rod 13 has an adjustment nut 19 screw mounted on it and adapted to abut against the felly 3 to limit any undue outward movement of the outer rim and it also has another adjustment nut 20 to fix the position of the plunger 14 thereon to adjust the tension of the spring 15 to give the proper resiliency. The sides of the adjacent segments 5 and 6 slightly overlap as at 21 in order that when any one of said segments desires a movement on its hinged or flexible connection with its adjacent segments, it will not form gaps between the segments which might fill with dirt or grit.

From the foregoing description it will readily be seen that I have produced a resilient wheel which can be given any desired resiliency by means of the springs 15 and at the same time one in which an individual segment may take the jolt or jar occasioned by encountering a small obstruction in the road surface without lifting the entire wheel over the same, which would act to jar the entire vehicle. In this respect my invention performs exactly the same function as pneumatic tires which give way merely at the point at which the encounter with the obstruction is had.

From the foregoing description it will be readily seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention.

Having thus described my invention what I claim as new and useful and desire to secure by Letters Patent is:—

A device of the character described comprising the combination with a hub, spokes and felly, of an inner rim mounted on said felly, an outer rim spaced from said inner rim and movable radially with respect to said inner rim, said outer rim being formed in sections flexibly joined, a plate secured to said hub between each pair of spokes, a pair of diverging tubes mounted on each plate, a spring pressed piston movable in each tube, a rod on each piston projecting through said felly and inner rim, a bifurcated member on each rod, the branches thereof being pivotally connected with lugs on the sections of said outer rim, a nut screw threaded on each rod and adapted to impinge against said felly, another nut screw threaded on each rod and adapted to engage said piston, and a tire on said outer rim, as described.

In testimony whereof I affix my signature in presence of two witnesses.

ERNEST A. PIERCE.

Witnesses:
CLARENCE M. SMITH,
VERADINE WARNER.

---

Copies of this patent may be obtained for five cents each, by addressing the "Commissioner of Patents, Washington, D. C."